United States Patent [19]

Goto

[11] 4,176,168

[45] Nov. 27, 1979

[54] PROCESS FOR PRODUCING CHLORINE DIOXIDE

[75] Inventor: Nobutaka Goto, Tokyo, Japan

[73] Assignee: Chlorine Engineers Corp., Ltd., Tokyo, Japan

[21] Appl. No.: 911,548

[22] Filed: Jun. 1, 1978

[30] Foreign Application Priority Data

Jun. 8, 1977 [JP] Japan ................................. 52-66607

[51] Int. Cl.$^2$ ............................................. C01B 11/02
[52] U.S. Cl. .................................................. 423/478
[58] Field of Search .......................... 423/478; 204/95

[56] References Cited

U.S. PATENT DOCUMENTS

| 3,524,728 | 8/1970 | Westerlund | 423/478 |
| 3,864,456 | 2/1975 | Winfield et al. | 423/478 |
| 3,929,974 | 12/1975 | Winfield | 423/478 |

*Primary Examiner*—Brian Hearn
*Attorney, Agent, or Firm*—Sughrue, Rothwell, Mion, Zinn and Macpeak

[57] ABSTRACT

A process for producing chlorine dioxide which comprises
(1) feeding hydrochloric acid and an excess on a stoichiometric basis of sodium chlorate produced in an electrolytic cell for producing sodium chlorate into a reaction zone for producing chlorine dioxide;
(2) reacting the hydrochloric acid and the sodium chlorate in the reaction zone to form a gaseous reaction product containing chlorine dioxide and chlorine and so that sodium chloride produced is precipitated to form a slurry-like residual reaction mixture containing the precipitated sodium chloride;
(3) continuously removing the chlorine dioxide as the gaseous reaction product;
(4) simultaneously withdrawing the slurry-like residual reaction mixture containing the precipitated sodium chloride continuously from the reaction zone;
(5) feeding water to the withdrawn residual reaction mixture to dissolve the sodium chloride and form a solution containing sodium chloride;
(6) blowing air or an inert gas through the solution containing sodium chloride to remove any residual chlorine dioxide and chlorine from the solution; and
(7) then recycling the solution to an electrolytic cell for the production of sodium chlorate.

9 Claims, 1 Drawing Figure

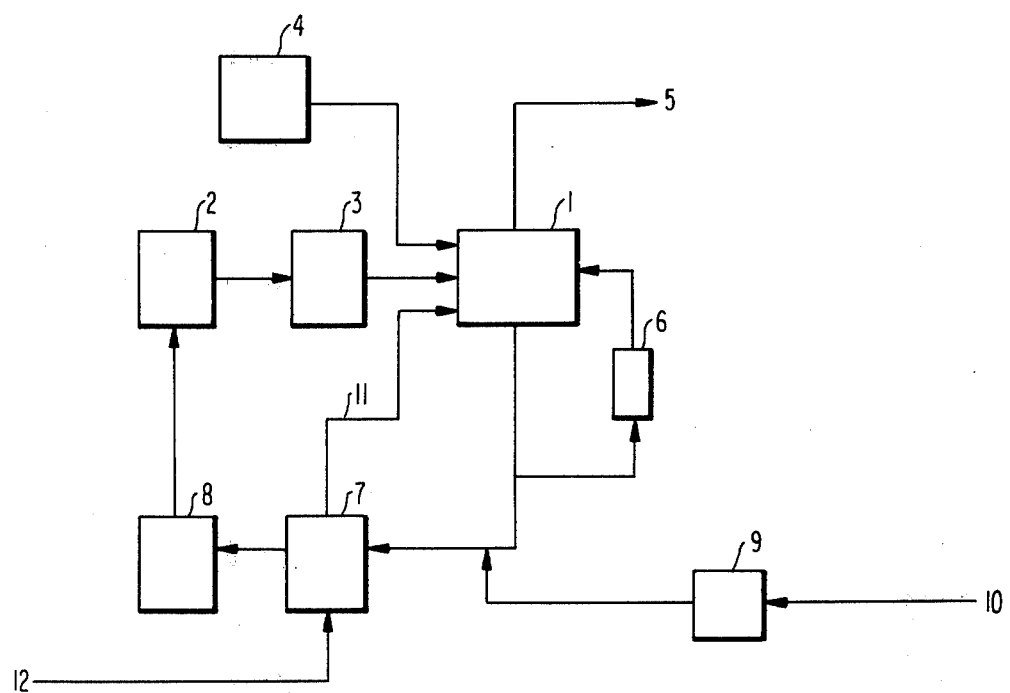

PROCESS FOR PRODUCING CHLORINE DIOXIDE

BACKGROUND OF THE INVENTION

1. Field of the Invention

This invention relates to a process for producing chlorine dioxide in which the process is superior both in terms of the equipment used and the economy achieved.

2. Description of the Prior Art

Canadian Pat. No. 782,574 discloses an electrolytic process for the production of chlorine dioxide starting with an aqueous solution of a metal chloride. In view of the fact that chlorine dioxide gas in concentrated form is spontaneously explosive, specific procedures and equipment must be employed in this process in order to minimize hazards as a result thereof. Thus, the equipment and process involved in conducting the process described in Canadian Pat. No. 782,574 is quite complicated.

Chlorine dioxide is often produced by reducing a chlorate, generally sodium chlorate. Known methods for producing chlorine dioxide involve reducing a chlorate with a strong acid such as sulfuric acid or hydrochloric acid in the presence of an alkali metal chloride.

Canadian Pat. No. 461,586 discloses a process for producing chlorine dioxide from hydrochloric acid in which the chlorine dioxide generator comprises a plurality of reaction vessels arranged in series. A liquid reaction mixture containing sodium chlorate, hydrochloric acid and sodium chloride is fed into the upper of a plurality of reactors from which the solution cascades by gravity through the remaining reactors. This process for the production of chlorine dioxide is not preferred since a plurality of reactors is involved and thus the equipment design and reaction mixture flow-through are complicated. The most efficient reduction method involves using hydrochloric acid as a reducing agent for the chlorate and a single reactor which also functions as a generator, an evaporator and a crystallizer, as disclosed in Canadian Pat. No. 969,735 (corresponding to British Pat. No. 1,347,740 and Japanese patent application (OPI) No. 15391/72) and U.S. Pat. No. 3,929,974 (corresponding to Japanese patent application (OPI) No. 59095/73).

Reduction of sodium chlorate with hydrochloric acid involves the following two reactions (1) and (2)

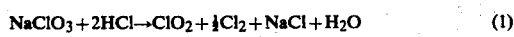

$$NaClO_3 + 2HCl \rightarrow ClO_2 + \tfrac{1}{2}Cl_2 + NaCl + H_2O \qquad (1)$$

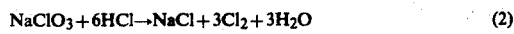

$$NaClO_3 + 6HCl \rightarrow NaCl + 3Cl_2 + 3H_2O \qquad (2)$$

To obtain chlorine dioxide with good efficiency, it is desirable to select reaction conditions which will promote reaction (1) while inhibiting reaction (2), for example by using a suitable catalyst or by selecting the proportions of the starting materials fed into the reactor such that reaction (1) will proceed mainly.

Sometimes, as described above to utilize sodium chloride in the spent reaction solution effectively, the recovered sodium chloride is fed as a starting material to an electrolytic cell for production of sodium chlorate.

For example, Canadian Pat. No. 825,084 discloses a process for the production of chlorine dioxide and chlorine and the production of an alkali metal salt in a single vessel by utilizing as starting materials an alkali metal chlorate, an alkali metal chloride and a strong acid in suitable proportions to generate chlorine dioxide and chlorine. However, after removal of the chlorine dioxide and chlorine generated in the reaction together with water vapor, the reaction mixture in the reaction vessel must be maintained at a sufficiently high temperature that water is removed from the reaction medium in order to crystallize out the alkali metal salt of the strong acid employed which can then be withdrawn and recovered from the reaction vessel as the alkali metal salt. Since an alkali metal chloride is often utilized as the material for production by electrolysis of the starting alkali metal chlorate, in the process of Canadian Pat. No. 825,084 only if hydrochloric acid is employed as the strong acid can recycling of the alkali metal chloride to an electrolytic cell for the production of alkali metal chlorate be considered and further without removal from the alkali metal salt recovered from the reaction system, after evaporation of water therefrom, of residual chlorine dioxide and chlorine gas can the alkali metal chloride be recycled to an electrolytic cell for the production of chlorine dioxide without explosion hazards arising.

Further, Canadian Pat. No. 826,577 discloses a process similar to that of Canadian Pat. No. 825,084, with the exception that sulfuric acid is employed as the strong acid and sodium sulfate is formed as a reaction product. Thus, the alkali metal salt formed, sodium sulfate, cannot be recycled to an electrolytic cell for the production of sodium chlorate for utilization as a starting material in the production of chlorine dioxide and chlorine.

The method disclosed in Canadian Pat. No. 969,735 comprises reacting hydrochloric acid with sodium chlorate in a reactor to form chlorine dioxide and chlorine, reducing the pressure of the reactor at that time, evaporating water at a temperature sufficient to crystallize sodium chloride, withdrawing a gaseous mixture of steam, chlorine and chlorine dioxide from the reactor, simultaneously recovering the solid sodium chloride precipitated, electrolyzing the recovered sodium chloride as an aqueous solution, and feeding the resulting sodium chlorate to the reactor mentioned above.

When the above method is operated under conditions which will precipitate sodium chloride, the slurry-like residual reaction mixture containing precipitated sodium chloride is withdrawn from the bottom of the reactor. The reaction mixture is separated into a solution and the solid sodium chloride. The solution is recycled to the reaction, and in the meantime, the solid sodium chloride is washed with water and re-dissolved, and fed into an electrolytic cell for the production of sodium chlorate. The solution of sodium chloride is electrolyzed to form sodium chlorate, and the sodium chlorate is fed into the reactor.

If the slurry-like residual reaction mixture containing the precipitated sodium chloride is fed continuously to the electrolytic cell for the production of sodium chlorate without the separating treatment, the unreacted hydrochloric acid remains in the residual reaction mixture and the pH of the residual reaction mixture becomes about 3 to 4 or lower. This tends to cause the generation of chlorine gas during the electrolysis in the electrolytic cell for production of sodium chlorate. Furthermore, since the chlorine dioxide and the chlorine present in the residual reaction mixture flow into the electrolytic cell, the chlorine can react with the hydrogen generated in the electrolytic cell giving rise to explosion hazards.

For this reason, this process described above requires a step for separating the residual reaction mixture and a step for washing and re-dissolving the sodium chloride, and therefore, the process steps become complicated. Moreover, according to this process, a reservoir for the residual reaction mixture is provided beneath the reactor to prevent a clogging of the withdrawal pipe because the withdrawal of the residual reaction mixture from the reactor is conducted intermittently, the reactor is at a reduced pressure, and the residual reaction mixture withdrawn contains a slurry of sodium chloride. Hence, the reactor must be installed at a high level above the ground, and the apparatus as a whole becomes large in size.

U.S. Pat. No. 3,929,974 discloses a process for producing chlorine dioxide by continuously feeding an aqueous solution of an alkali metal chlorate and hydrochloric acid into a reaction zone where chlorine dioxide and chlorine are continuously formed by the reaction between the alkali metal chlorate and the hydrochloric acid. During the reaction, the reaction medium is maintained at its boiling point to evaporate water from the reaction medium to form a gas phase in the reaction zone consisting of a mixture of chlorine dioxide, chlorine and water vapor which is then removed from the reaction zone. Two embodiments of the process are disclosed, one in which sodium chloride produced in the reaction is not precipitated but rather is removed as a liquid effluent continuously to maintain the liquid level in the reaction zone constant and another in which solid sodium chloride as a precipitate is removed from the reaction zone. In the first embodiment in which a liquid medium containing the sodium chloride is removed, such also contains dissolved therein chlorine dioxide and chlorine which is not stripped in the reaction vessel, and due to the presence of these materials a series of side reactions occur, some which are particularly dangerous when large quantities of hydrogen are mixed with the chlorine dioxide and chlorine and which reduce the efficiency of the electrolytic cell used to convert sodium chloride into sodium chlorate. In the second embodiment, in which solid sodium chloride is removed from the reaction zone, such is continuously dissolved in water and then fed to an electrolytic cell for the production of chlorate where it is converted into sodium chlorate and hydrogen. Unfortunately, just as was the situation with Canadian Pat. No. 969,735, this mixture containing solid sodium chloride removed from the reaction zone will also contain chlorine dioxide and chlorine which, when passed into an electrolytic cell, the chlorine can react with hydrogen generated in the electrolytic cell to give rise to explosion hazards.

SUMMARY OF THE INVENTION

An object of this invention is to solve the above described problems, and to produce chlorine dioxide advantageously both from the standpoint of the equipment involved and the economy obtained without the need for a complicated and large-scaled process.

The present invention provides a process for producing chlorine dioxide which comprises (1) feeding hydrochloric acid and an excess on a stoichiometric basis of sodium chlorate produced in an electrolytic cell for producing sodium chlorate into a reaction zone for producing chlorine dioxide;

(2) reacting the hydrochloric acid and the sodium chlorate in the reaction zone to form a gaseous reaction product containing chlorine dioxide and chlorine and so that sodium chloride produced is precipitated to form a slurry-like residual reaction mixture containing the precipitated sodium chloride;

(3) continuously removing the chlorine dioxide as the gaseous reaction product;

(4) simultaneously withdrawing the slurry-like residual reaction mixture containing the precipitated sodium chloride continuously from the reaction zone;

(5) feeding water to the withdrawn residual reaction mixture to dissolve the sodium chloride and form a solution containing sodium chloride;

(6) blowing air or an inert gas through the solution containing sodium chloride to remove any residual chlorine dioxide and chlorine from the solution; and (7) then recycling the solution to an electrolytic cell for the production of sodium chlorate.

In another embodiment, the process additionally includes feeding the residual chlorine dioxide and chlorine removed by blowing air or an inert gas through the solution containing the sodium chloride into the reaction zone for the production of chlorine dioxide.

BRIEF DESCRIPTION OF THE ACCOMPANYING DRAWING

The FIGURE is a flowsheet showing one embodiment of the process of this invention.

DETAILED DESCRIPTION OF THE INVENTION

Since in the present invention, hydrochloric acid is reacted with an excess of sodium chlorate, the hydrochloric acid is almost completely consumed in the reaction, and the amount of hydrochloric acid contained in the solution containing sodium chloride formed by adding water to the withdrawn residual reaction mixture is small, e.g., about 5 g/l or less, more generally 0.5 g/l or less. As a result, the pH of the solution containing sodium chloride formed by adding water to the withdrawn residual reaction mixture is maintained at about 3 to 4 or higher, and chlorine gas is not generated when the solution containing sodium chloride formed by adding water to the withdrawn residual reaction mixture is electrolyzed in the electrolytic cell for the production of sodium chlorate. Furthermore, air or an inert gas is blown through the solution containing sodium chloride formed by adding water to the withdrawn residual reaction mixture from the reactor for production of chlorine dioxide to remove chlorine dioxide gas and chlorine gas dissolved in this solution, and the remainder is fed into the electrolytic cell for the production of sodium chlorate. For this reason, there is no risk of an explosion occurring due to a reaction between the chlorine gas generated in the electrolytic cell or chlorine gas which flows into the electrolytic cell and hydrogen gas. Thus, the step of separating the solid sodium chloride from the solution containing sodium chloride formed by adding water to the withdrawn residual reaction mixture necessary in the prior art is not required in the process of this invention.

The present invention is described in detail by reference to the Figure. In the Figure, reference numeral 1 represents a reactor for the production of chlorine dioxide. Hydrochloric acid and sodium chlorate as starting materials and as aqueous solutions are fed separately into the reactor, with the sodium chlorate being fed in an excessive amount, e.g., in a molar ratio of the hydrochloric acid to the sodium chlorate generally of about 0.3:1 to less than about 2:1, preferably 0.5:1 to 1:1, and are reacted in the reactor. A suitable concentration of hydrochloric acid which can be used is about 200 to about 400 g/l, preferably around 350 g/l and a suitable concentration of sodium chlorate which can be used is about 300 to about 600 g/l, preferably 450 to 550 g/l. The hydrochloric acid aqueous solution is generally fed at room temperature (about 20°-30° C.) and the sodium chlorate aqueous solution is generally fed at temperature of from about 60° to about 90° C. The reactor is maintained at reduced pressure, and water is evaporated at a temperature sufficient to precipitate sodium chloride as a solid salt, e.g., at a temperature of about 65°-80° C. in the reactor. The resulting chlorine dioxide and chlorine are obtained using steam as a carrier. Thus, this single reactor has the function of a generator, an evaporator and a crystallizer, and is of the type disclosed, for example, in Canadian Pat. No. 825,084.

In an electrolytic cell 2 for the production of sodium chlorate, an aqueous solution of sodium chloride is electrolyzed, and the resulting aqueous solution of sodium chlorate is fed into a reservoir 3. Descriptions of electrolytic cells which can be used are set forth in U.S. Pat. No. 3,350,286. A suitable electrolytic cell voltage is about 3 to about 5V, a suitable current density is about 5 to 20 A/dm$^2$ and a suitable temperature for the electrolysis is about 45° C. or higher up to about the boiling point of the electrolyte, preferably 60° to 80° C. A suitable concentration of the sodium chloride aqueous solution in the electrolysis is about 50 g/l or more, preferably 100 to 300 g/l, and in general the concentration of the sodium chlorate at the outlet of the electrolytic cell after continuous operation (i.e., circulation of sodium chlorate) is about 300 to about 600 g/l.

The aqueous solution of sodium chlorate is then fed from reservoir 3 to the reactor 1. In the meantime, hydrochloric acid is fed from a reservoir 4 into the reactor 1.

It is important for the amount of sodium chlorate fed to be in excess of the stoichiometric amount for reaction between the sodium chlorate and hydrochloric acid to permit substantially complete consumption of the hydrochloric acid in the reaction.

Desirably, sodium chlorate and hydrochloric acid are reacted while maintaining the reactor 1 at a reduced pressure of about 100 to about 700 mmHg, preferably about 100 to about 300 mmHg, and about 65 to about 80° C. which is the boiling point of the solution at this pressure. These conditions are determined because it is preferred to maintain the reaction system at reduced pressure so as to promote the generation of a vapor and cause the chemical equilibrium in the reaction for generating chlorine dioxide to shift toward the generation of chlorine dioxide, and it is necessary to perform the reaction at a temperature below the point (about 85° C.) at which chlorine dioxide substantially decomposes. A catalyst is not necessary for this reaction but, if one is used silver ion, mangasese ion, chromium ion and the like can be suitably used in the form of fine powders thereof. The conditions of a high temperature (e.g., about 65 to 80° C.) and a reduced pressure (e.g., 100 to 700 mmHg, preferably about 100 to about 300 mmHg) described above and used in this step also cause the precipitation of sodium chloride.

The resulting chlorine dioxide and chlorine are withdrawn as a gaseous product 5 together with the steam. Although it often is not necessary to separate the chlorine dioxide from the mixture of chlorine dioxide and chlorine gas obtained in this invention, if desired, the chlorine dioxide and chlorine gas may be separated. A suitable separation procedure comprises passing the gaseous mixture through cold water (e.g., at about 5° C. or less) whereby chlorine dioxide dissolves in the cold water but the chlorine gas does not dissolve in the cold water.

The residual reaction mixture containing precipitated solid sodium chloride, dissolved sodium chloride, unreacted sodium chlorate, unreacted hydrochloric acid and dissolved chlorine dioxide and chlorine is withdrawn from the reactor 1 through the inlet pipe of a thermosiphon-type reboiler beneath the reactor 1 while the liquid level within the reactor 1 is maintained constant. A part of the residual reaction mixture is heated by reboiler 6, and then recycled to the reactor with the remainder of the residual reaction mixture being circulated to the electrolytic cell 2 after having been subjected to water treatment and gas treatment. Since hydrochloric acid is consumed almost completely in the reaction and is present only in a very small amount as described hereinbefore in the residual reaction mixture, the pH of the residual reaction mixture is maintained in about 3 to 4 or higher. Water 10 heated, e.g., to a temperature of about 50 to about 80° C., preferably 70 to 75° C., by a heat exchanger 9 is continuously fed into the residual reaction mixture withdrawn from the reactor 1 so as to dissolve the solid sodium chloride. Then, this mixture is fed into a tank 7 maintained at the same pressure as the reactor through an equalizing line (a ventilated pipe for causing the pressure to be uniform) 11, and stirred to dissolve the solid sodium chloride and form a solution containing sodium chloride. Simultaneously, the dissolved chlorine dioxide gas and chlorine gas are removed by air 12 from which oil has been removed or an inert gas (e.g., nitrogen gas) and which is blown through the bottom of the tank 7.

The chlorine dioxide and chlorine removed are recycled to the reactor 1 through the equalizing line 11 and are effectively used and pollution by the chlorine dioxide and the chlorine is prevented.

Tank 7 is preferably maintained at a temperature above a certain point in order to facilitate the removal of the dissolved gases in the solution containing sodium chloride and the dissolving of the precipitated salt. For example, good results can be obtained by operating the reactor 1 at about 100 to about 700 mmHg, preferably about 100 to about 300 mmHg, and about 65 to about 80° C., adjusting the temperature of the hot water fed to the withdrawn residual reaction mixture at about 55 to about 70° C., and operating the tank 7 at about 50 to about 65° C.

The sodium chloride-containing solution resulting from the above-described procedure which will generally contain a maximum of 100 ppm of a mixture of chlorine gas and chlorine dioxide is fed into a reservoir 8 from where it is recycled to an electrolytic cell 2 for production of sodium chlorate.

Since in the present invention hydrochloric acid and sodium chlorate are reacted with the sodium chlorate being present in an excessive proportion to permit substantially complete consumption of the hydrochloric acid in the reaction, the pH of the solution containing sodium chloride to be recycled to the electrolytic cell for production of sodium chlorate can be maintained at about 3 to 4 or higher. Hence, the likelihood of chlorine gas generation by electrolysis in the electrolytic cell for producing sodium chlorate is substantially minimized.

Furthermore, since in the present invention, chlorine dioxide and chlorine in the solution containing sodium chloride are removed by blowing air or an inert gas through the solution, gases do not flow into the electrolytic cell for production of sodium chlorate even if solid salt in the solution is not separated and washed. Consequently, there is no risk of explosion by reaction of hydrogen and chlorine in the electrolytic cell.

The present invention thus does not require the steps of separating and washing of the solid sodium chloride in the residual reaction mixture as in the prior art, and therefore, equipment necessary for these steps can be omitted. It is also unnecessary to provide a device for withdrawing the residual reaction mixture and separating the solid sodium chloride intermittently at a position below the reactor. Hence, the process as a whole can be simplified and the scale is small, and the withdrawal of the residual reaction mixture and the feeding of the solution containing sodium chloride to the electrolytic cell for production of sodium chlorate can be performed continuously.

In addition, sodium chloride, chlorine dioxide and chlorine present in the solution containing sodium chloride in the production of chlorine dioxide can be effectively utilized.

Chlorine dioxide produced by the process of this invention can be used for bleaching of pulp and in other applications.

The following Examples are given to illustrate the present invention in greater detail. Unless otherwise indicated, all parts percents, ratios and the like are by weight.

EXAMPLE 1

Chlorine dioxide was produced under the following conditions using a titanium-made cylinder (inside diameter 200 mm × height 1000 mm) as a chlorine dioxide generating reactor 1, an electrolytic cell (bipolar electrode type, 65 Amp.) as a sodium chlorate-producing electrolytic cell 2, a water ejector made of titanium, and a double tube type heat exchanger having a titanium inside pipe as a heat exchanger 9.

(1) Electrolysis Conditions in the Electrolytic Cell 2 for Production of Sodium Chlorate:

Electrolytic Cell: bipolar electrode-type, 65 Amp.
Current Density: 30 A/dm$^2$
Electrolysis Temperature: 55° C.
Current Efficiency: 90%

(2) Conditions for Production of Chlorine Dioxide in Reactor 1:

Hydrochloric Acid Aqueous Solution Fed to Reactor 1

Flow Rate: 1.9 liters/hr.
Temperature: 20° C.
HCl Concentration: 345.9 g/liter

Aqueous Solution of Sodium Chlorate Fed to Reactor 1

Flow Rate: 6.0 liters/hr.
Temperature: 60° C.
NaClO$_3$ Concentration: 597 g/liter
NaCl Concentration: 117 g/liter
Reaction Pressure in Reactor 1: 200 mmHg (abs.)
Reaction Temperature in Reactor 1: 74° C.

(3) Conditions for Treating the Residual Reaction Mixture:

Residual Reaction Mixture

Flow Rate: 4.7 liters/hr.
Temperature: 75° C.
NaClO$_3$ Concentration: 572 g/liter
NaCl Concentration: 148 g/liter (a saturated solution of 10% by weight slurry)

Hot Water Fed to the Residual Reaction Mixture

Flow Rate: 1.6 liters/hr.
Temperature: 60° C.

Air Blown into the Sodium Chloride-Containing Mixture

Flow Rate: 200 liters/hr.

Treated Sodium Chloride-Containing Mixture Fed into the Electrolytic Cell for Production of Sodium Chlorate:

Flow Rate: 6.5 liters/hr.
Temperature: 60° C.
NaClO$_3$ Concentration: 416 g/liter
NaCl Concentration: 181 g/liter (4) Gases Produced from Reactor 1:
Composition: ClO$_2$ 500 g/hr. Cl$_2$ 380 g/hr. Steam 2842 g/hr.
Temperature: 75° C.
Pressure: 200 mmHg (abs.)

While the invention has been described in detail and with reference to specific embodiments thereof, it will be apparent to one skilled in the art that various changes and modifications can be made therein without departing from the spirit and scope thereof.

What is claimed is:

1. A process for producing chlorine dioxide which comprises
   (1) feeding hydrochloric acid and an excess on a stoichiometric basis of sodium chlorate produced in an electrolytic cell for producing sodium chlorate into a reaction zone for producing chlorine dioxide;
   (2) reacting the hydrochloric acid and the sodium chlorate in the reaction zone at a temperature of about 65° to about 80° C. under a reduced pressure of about 100 to about 700 mmHg to form a gaseous reaction product containing chlorine dioxide and chlorine and so that sodium chloride produced is precipitated to form a slurry-like residual reaction mixture containing the precipitated sodium chloride;
   (3) continuously removing the chlorine dioxide as the gaseous reaction product;
   (4) simultaneously withdrawing the slurry-like residual reaction mixture containing the precipitated sodium chloride continuously from the reaction zone;
   (5) feeding water to the thus withdrawn residual reaction mixture to dissolve the sodium chloride and form a solution containing sodium chloride;
   (6) blowing air or an inert gas through the solution containing sodium chloride to remove any residual chlorine dioxide and chlorine from the solution;
   (7) recycling the chlorine dioxide and chlorine removed from the solution to the reaction zone through an equalizing line; and
   (8) then recycling the solution to an electrolytic cell for the production of sodium chlorate.

2. The process of claim 1, wherein the molar ratio of the hydrochloric acid to the sodium chlorate fed is about 0.3:1 to less than about 2:1.

3. The process of claim 1, wherein the hydrochloric acid and the sodium chlorate are fed as aqueous solutions thereof at a concentration of about 200 to about 400 g/l and about 300 to about 600 g/l, respectively.

4. The process of claim 1, wherein the continuous removing of the chlorine dioxide as the gaseous product is using steam.

5. The process of claim 1, wherein the water fed to the withdrawn residual reaction mixture to dissolve the sodium chloride is at a temperature of about 55° to about 70° C.

6. The process of claim 1, wherein the use of said pressure in said reaction zone promotes the generation of water vapor therein and causes the chemical equalibrium in the reaction for generating chlorine dioxide to shift towards the generation of chlorine dioxide and causes the precipitation of sodium chloride.

7. The process of claim 1, wherein steps (1) and (5) are conducted at the same pressure.

8. The process of claim 1, wherein said slurry-like residual reaction mixture is withdrawn from the reaction zone via means different from said equalizing line.

9. The process of claim 1, wherein said recycle of step (8) is without separating and washing sodium chloride present in the recycling solution.

* * * * *